(12) United States Patent
Ward et al.

(10) Patent No.: US 7,977,852 B2
(45) Date of Patent: Jul. 12, 2011

(54) METHOD AND APPARATUS FOR HARVESTING ENERGY FROM MECHANICAL VIBRATIONS

(75) Inventors: John Kelvin Ward, Mayfield (AU); Sam Behrens, Mayfield (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 234 days.

(21) Appl. No.: 12/226,430

(22) PCT Filed: Apr. 18, 2007

(86) PCT No.: PCT/AU2007/000492
§ 371 (c)(1),
(2), (4) Date: Oct. 17, 2008

(87) PCT Pub. No.: WO2007/118277
PCT Pub. Date: Oct. 25, 2007

(65) Prior Publication Data
US 2009/0127976 A1 May 21, 2009

(30) Foreign Application Priority Data

Apr. 18, 2006 (AU) .............................. 2006902000
Feb. 22, 2007 (AU) .............................. 2007900908

(51) Int. Cl.
*H01L 41/08* (2006.01)

(52) U.S. Cl. ...................................... 310/339; 310/325

(58) Field of Classification Search ............... 310/311, 310/329, 338, 339, 317, 319
See application file for complete search history.

(56) References Cited

U.S. PATENT DOCUMENTS

| 4,781,023 | A | 11/1988 | Gordon |
| 6,954,025 | B2 * | 10/2005 | Nishida et al. ............... 310/339 |
| 6,984,902 | B1 | 1/2006 | Huang et al. |
| 7,105,982 | B1 | 9/2006 | Hagood et al. |
| 2004/0174098 | A1 | 9/2004 | Hsu et al. |
| 2005/0120527 | A1 | 6/2005 | Tanielian |
| 2006/0130476 | A1 | 6/2006 | Fitch et al. |

FOREIGN PATENT DOCUMENTS

| FR | 2 854 006 | 10/2004 |
| WO | 03/096444 | 11/2003 |
| WO | WO 03/096444 A2 | 11/2003 |
| WO | 2006/046937 | 5/2006 |
| WO | WO 2006/046937 A1 | 5/2006 |

OTHER PUBLICATIONS

International Search Report for PCT/AU2007/000492, mailed Jun. 15, 2007.
International Preliminary Report on Patentability for PCT/AU2007/000492, mailed Jun. 16, 2008.

* cited by examiner

*Primary Examiner* — Mark Budd
(74) *Attorney, Agent, or Firm* — Nixon & Vanderhye P.C.

(57) ABSTRACT

A method of harvesting energy from a vibrational energy source having a varying energy characteristic. The method includes the step of varying a characteristic of a harvesting arrangement arranged to harvest the energy, the characteristic of the harvesting arrangement being varied in response to the varying energy characteristic of the vibrational energy source.

13 Claims, 15 Drawing Sheets

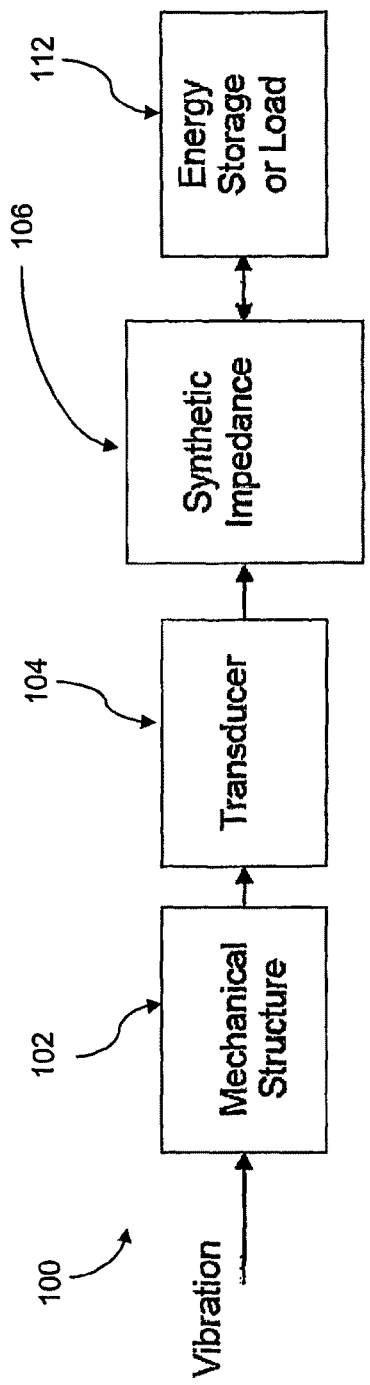
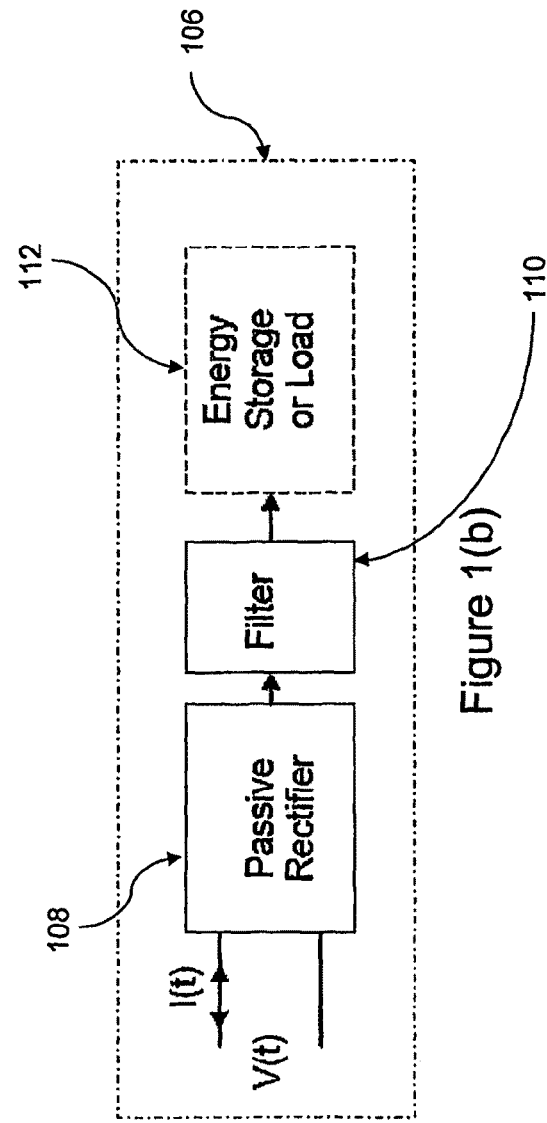
Figure 1(a)
Figure 1(b)

METHOD AND APPARATUS FOR HARVESTING ENERGY FROM MECHANICAL VIBRATIONS

This application is the U.S. national phase of International Application No. PCT/AU2007/000492, filed 18 Apr. 2007, which designated the U.S. and claims priority to Australia Application Nos. 2006902000, filed 18 Apr. 2006, and 2007900908, filed 22 Feb. 2007, the entire contents of each of which are hereby incorporated by reference.

FIELD OF THE INVENTION

The present invention relates to a method and apparatus for harvesting energy, and particularly, but not exclusively, to a method and apparatus for harvesting energy from vibrations.

BACKGROUND OF THE INVENTION

Vibration Energy Harvesting (VEH) is a relatively new concept relating to the conversion of mechanical energy (resulting from a vibration) to electrical energy for subsequent use or store. Typically, the mechanical to electric conversion is performed using either an electromagnetic transducer or a piezoelectric transducer, though many other transducer types may be utilised.

Vibration rich environments suitable for energy harvesting can be found in almost every facet of everyday life. For example, through the simple action of walking, a vibration is experienced which could potentially be harvested and used to power a device, such as, for example, a mobile phone.

Generally, present arrangements for VEH propose the use of a harvesting circuit configured to extract the energy in electrical form from the transducer and drive a load (such as a mobile phone). The harvesting circuit includes components that provide impedance or components that are controlled to synthesise an impedance or admittance (e.g. a controlled switch circuit). The impedance is generally chosen in an attempt to "match" the mechanical and transducer system from which the energy is harvested, in an attempt to obtain optimum energy transfer.

Vibrational energy tends to be "bursty"; however, occurring as discrete (and sometimes unpredictable) bursts (e.g. when a step is taken when a person is walking). Energy is not harvested efficiently, even where a harvesting circuit is designed which effectively impedance matches the mechanical and transducer system.

SUMMARY OF THE INVENTION

In accordance with a first aspect, the present invention provides a method of harvesting energy from a vibrational energy source having a varying energy characteristic, including the step of varying a characteristic of a harvesting arrangement arranged to harvest the energy, the characteristic of the harvesting arrangement being varied in response to the varying energy characteristic of the vibrational energy source.

The characteristic of the harvesting arrangement may be any characteristic that may affect energy transfer from the vibrational energy source. In an embodiment the harvesting arrangement includes an electrical harvesting circuit and the characteristic of the harvesting arrangement is impedance of the harvesting circuit.

The applicants have discovered that by varying the characteristic of the harvesting arrangement in response to the varying energy characteristic, in at least an embodiment it is possible to increase the efficiency of the energy transfer. This approach is quite different from that of the prior art. Instead of selecting a value of a characteristic of a harvesting circuit to match the mechanical system (prior art) and then maintaining the value, the characteristic of the harvesting arrangement in the present invention is varied in response to the varying energy characteristic of the source. The present applicants have discovered that this approach can result in an increase in efficiency of energy transfer. This had not been appreciated in the prior art, where it has been implicitly accepted that a static or linear value of a characteristic, such as impedance of a harvesting circuit, was necessary for optimum energy transfer. This is in fact incorrect, as the present inventors have realised, particularly for vibrational sources where the energy is "bursty".

The characteristic of the vibration energy source may vary in any number of ways. In an embodiment, the varying energy characteristic may vary irregularly, and may be unpredictable to a certain extent. In another embodiment, the variation may be regular, such as a sine wave.

In an embodiment, the method includes the further steps of monitoring the varying energy characteristic to obtain a variation parameter, and controlling the varying of the characteristic of the harvesting arrangement, utilising the variation parameter. In an embodiment including an electrical transducer to convert the vibrational energy, the variation parameter may be current or voltage from the transducer. In an alternative embodiment the variation parameter may be magnitude of vibration (e.g. measurement of disturbance). In an embodiment, the variation parameter may include a plurality of parameters which can be used to control the varying of the characteristic of the harvesting arrangement.

In an embodiment, the method includes the further steps of monitoring changes in the varying energy characteristic and adaptively controlling the variation of the characteristic of the harvesting arrangement in response to the changes. In an embodiment the step of adaptively controlling includes a step of predicting changes in the varying energy characteristic and controlling the variation of the characteristic of the harvesting arrangement in response to the predicted changes. The magnitude and extent of the vibrational energy may vary. In an embodiment an adaptive learning algorithm may be implemented to control the harvesting arrangement to respond to these variations. In an embodiment where the harvesting arrangement includes an electrical harvesting circuit, a controller may include a program including the adaptive learning algorithm, to control the harvesting circuit.

The vibrational energy source may be any source (although usually it will be mechanical) which gives out bursts or pulses of energy, regularly or irregularly. The source may be a person walking, for example, or a mechanical system such as a vehicle suspension system, or a large structure such as a bridge. In an embodiment, the energy source may also include random or broadband vibrations which provide the energy.

In accordance with a second aspect, the present invention provides an apparatus for harvesting energy from a vibrational energy source having a varying energy characteristic, the apparatus including a harvesting arrangement arranged to harvest the energy, the harvesting arrangement having a characteristic which is arranged to be varied in response to the varying energy characteristic of the vibrational energy source.

In an embodiment the apparatus includes a controller arranged to control the harvesting arrangement to vary the characteristic of the harvesting arrangement. In an embodiment the apparatus includes a monitor for monitoring the varying energy characteristic to obtain a variation parameter. The variation parameter is employed by the controller to control the varying characteristic of the harvesting arrangement. In an embodiment including an electrical transducer to convert the vibrational energy, the variation parameter may be current or voltage from the transducer. In an alternative embodiment, the variation parameter may be magnitude of vibration (e.g. obtained by measurement of disturbance).

In an embodiment, the harvesting arrangement includes an electrical harvesting circuit and the characteristic of the harvesting arrangement is impedance of the harvesting circuit.

In an embodiment that includes the monitor and the controller, changes in the variable energy characteristic may be monitored and the variation of the characteristic of the harvesting arrangement may be adaptively controlled in response to the changes. The controller may be arranged to predict changes in the variable energy characteristic and control the variation of the characteristic of the harvesting arrangement in response to the predicted changes. In an embodiment, the controller may implement an adaptive learning algorithm to control the harvesting arrangement.

In accordance with a third aspect, the present invention provides a computer program arranged to control a computing device and harvesting circuit to implement an apparatus in accordance with the second aspect of the invention. The computer program may be implemented in hardware and/or software which may include low power micro-processors, digital signal processors (DSP's) and the like.

In accordance with a fourth aspect, the present invention provides a computer readable medium providing a computer program in accordance with the third aspect of the invention.

In accordance with a fifth aspect, the present invention provides an apparatus for controlling a harvesting arrangement for harvesting energy from a vibrational energy source having a varying energy characteristic, the apparatus including a controller arranged to control a characteristic of the harvesting arrangement to vary the characteristic of the harvesting arrangement in response to the varying energy characteristic.

In an embodiment, the apparatus may include a monitor for monitoring the varying energy characteristic.

In an embodiment, the controller is arranged to adaptively control the variation of the characteristic of the harvesting arrangement in response to changes in the variable energy characteristic. The controller may be arranged to predict changes in the variable energy characteristic and control the variation of the characteristic of the harvesting arrangement in response to the predicted changes. In an embodiment, the controller may implement an adaptive learning algorithm to control the harvesting arrangement.

In accordance with a sixth aspect, the present invention provides a computer program for controlling a computing device to implement an apparatus in accordance with the fifth aspect of the invention.

In accordance with a seventh aspect, the present invention provides a computer readable medium providing a computer program in accordance with the sixth aspect of the invention.

A further aspect of the present invention is not limited to the harvesting of energy from mechanical vibrations. There are other fields where this aspect may be applicable. For example, in thermo-acoustics, which is still a vibration system but the vibrations are heat driven. A further application would be energy storage in a rotating fly wheel, and also hydroelectric generation from water stored in a dam.

In accordance with an eighth aspect, the present invention provides a method of harvesting energy from an energy source having a varying energy characteristic, including the step of varying the characteristic of the harvesting arrangement arranged to harvest the energy, the characteristic of the harvesting arrangement being varied in response to the varying energy characteristic of the energy source.

In accordance with a ninth aspect, the present invention provides an apparatus for harvesting energy from an energy source having a varying energy characteristic, the apparatus including a harvesting arrangement arranged to harvest the energy, the harvesting arrangement having a characteristic which is arranged to be varied in response to the varying energy characteristic of the energy source.

In an embodiment, the present inventors have appreciated that the total amount of energy that may be extracted from a system is influenced by the timing of when the energy is extracted.

In accordance with a tenth aspect, the present invention provides a method for extracting energy from an energy source having a varying energy characteristic, comprising the steps of extracting the energy at determined times during the varying energy characteristic.

In accordance with an eleventh aspect, the present invention provides an apparatus for extracting energy from an energy source having a varying energy characteristic, the apparatus comprising a harvesting arrangement arranged to extract the energy at determined times during the varying energy characteristic.

BRIEF DESCRIPTION OF THE DRAWINGS

Features and advantages of the present invention will become apparent from the following description of embodiments thereof, by way of example only, with reference to the accompanying drawings, in which;

FIGS. 1(a) and (b) are block diagrams of prior art arrangements for VEH;

DETAILED DESCRIPTION OF PREFERRED EMBODIMENTS

Figure 2B:
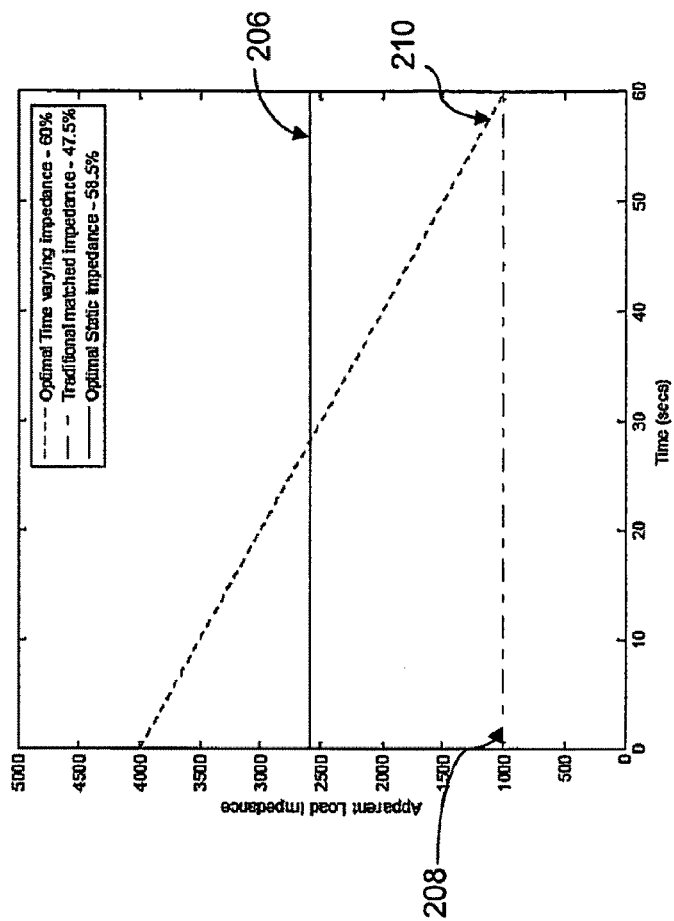
FIG. 2(b) is a graph of apparent load impedance against time for the arrangement of FIG. 2(a) for different load impedance conditions.

Before describing in detail an embodiment of a method and apparatus of the present invention, a prior art energy harvesting arrangement will be described with reference to FIGS. 1(a) and (b).

A mechanical structure 102 is arranged to receive a vibration from an external source. The vibration is converted from a mechanical force into an electrical energy by way of a transducer 104, which may be a piezoelectric transducer. The output of the transducer 104 is electrically connected to a synthetic impedance circuit 106. The synthetic impedance circuit 106 synthesises an impedance value of the "load" and at times is powered by energy supplied from the energy store or load 112. A synthesised impedance value is selected to "match" the mechanical and transducer system 102, 104 in an attempt to optimise energy transfer. This involves establishing linear, or static, load impedance for "optimum" energy transfer. As has been appreciated by the inventors, however, such conventional treatment of the impedance characteristic does not provide optimal energy transfer to the load when the characteristics of the input energy source (such as frequency of vibration, force, period between vibrations etc.) are changing over time, or are "bursty". Furthermore, prior art arrangements do not take into account the real energy loss associated with emulating reactive circuit elements. Since vibration systems often have large amounts of reactive energy, emulating reactive circuit elements may waste considerable real energy, possibly preventing a harvesting circuit from obtaining any net real energy output, although some reactive power flow does help to keep the system vibrating.

The following illustration is to assist in the understanding of the problems associated with energy transfer from a vibrational energy source and to facilitate a better understanding of the present invention.

Figure 2A:
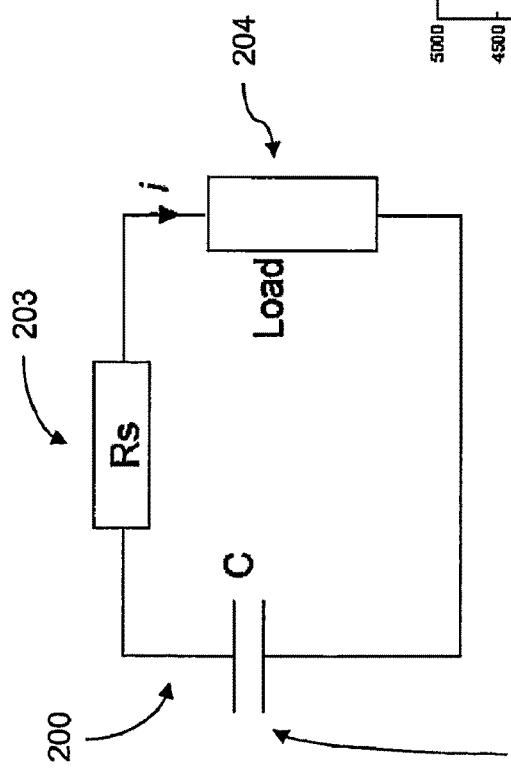
FIG. 2(a) is a simple circuit included for purposes of illustration of the energy transfer problems posed by VEH.

The vibrational systems that embodiments of the present invention deal with typically receive energy in discrete bursts, so the problem can loosely be considered "How do we extract the maximum energy out of a burst of energy, before the next burst comes along?". Referring to FIGS. 2(a) and 2(b), a simplified example is shown for illustrating the energy transfer problems, and a solution in accordance with an embodiment of the present invention. The simple circuit configuration of FIG. 2(a) is not a vibration system (so the effects of reactive power are not considered), however the behaviour is analogous to the vibration systems dealt with by embodiments of present invention (described in detail later).

The circuit 200 of FIG. 2(a) comprises a capacitor 202 having a source impedance ($R_s$) represented by circuit element 203 and an initial charge ($V_0$). The capacitor 202 is connected in series to a load 204. Example parameter values are;

$V_0$=10V
C=20 mF
$R_s$=1 kΩ
$T_p$=60 seconds

These parameters give an initial condition of 1 Joule energy stored in the capacitor 202.

1) Traditional Maximum Power Transfer

The traditional maximum power transfer problem implicitly assumes that the source (the capacitor 202 in this case) has infinite available power, though it is restricted by the source impedance $R_s$. The solution to the maximum power transfer problem is to set the load impedance equal to the complex conjugate of the source impedance. For this simplified example, this just means that load impedance $R_L$ equals $R_s$ and for the parameters given 47.5% of the energy in the capacitor 202 will be absorbed by the load in time $T_p$ (see FIG. 2(b)).

2) "Optimal" Impedance for Maximum Energy Transfer

As discussed above, fixed optimal load impedance ($R_L$) may be determined in an attempt to maximise the energy absorbed by the load in time $T_p$. Thus, the energy absorbed by the load 204 for the circuit 200 would be given by the formulae:

$$E_L = \frac{1}{2}CV_0^2\left(\frac{R_L}{R_s+R_L}\right)\left(1 - e^{\frac{-2T_p}{(R_s+R_L)C}}\right) \quad (1)$$

which when maximised for the example parameters of the circuit 200, results in 58.5% of the energy in the capacitor 202 being absorbed by the load 204 in time $T_p$ (see FIG. 2(b)).

According to both of the above described techniques, the system behaviour must be known in advance so that the system can be configured.

In accordance with an embodiment of the present invention, rather than restricting the load to a static impedance (as observed by conventional techniques), the impedance is varied based on the voltage/current relationship. According to the simple circuit configuration 200, the energy absorbed by the load ($E_L$) is expressed in these terms as:

$$E_L = V_0\int_0^{T_p}i(\tau)d\tau - \frac{1}{2C}\left(\int_0^{T_p}i(\tau)d\tau\right)^2 - R_s\int_0^{T_p}i^2(\tau)d\tau \quad (2)$$

From Equation (2), it can be seen that the energy absorbed by the load ($E_L$) is equal to the energy lost by the capacitor 202 (i.e. the first two terms), minus the energy consumed by the source impedance ($R_s$). If Equation (2) is expressed in terms of the instantaneous impedance of the load (as shown below in Equation (3)), it can be seen that the optimal solution for transferring energy to the load 204 according to this embodiment is in fact given by varying the load impedance over time $T_p$.

$$R_L(t) = \frac{T_P - t}{C} + R_S \quad (3)$$

where $t \in [0, T_p]$

Again with reference to FIG. 2(b), it can be seen that by varying the load impedance over time $T_p$ equates to a 60% energy transfer to the load.

This shows that, in accordance with an embodiment of the present invention, that with an understanding of the input energy characteristics, the energy transfer between the energy source and the load may be optimised. In the prior art, even when system excitation is considered an attempt is made to select the "optimum" (fixed) impedance the attempt at optimal energy transfer fails. The present inventors have appreciated that, even for this simplified example system, the optimal impedance is actually a time varying function rather than a static relationship (hence, the load impedance could in fact be a non-linear load impedance etc.). In the prior art, anyone looking at this problem from the perspective of identifying the optimal impedance is immediately constrained to suboptimal results.

Referring to FIGS. 3(a) and 3(b), there is shown a force diagram 300 and equivalent circuit of a transducer 302 that can be used to translate mechanical energy into electrical energy. The transducer in this case is an electromagnetic transducer. The transducer may provide an input to a harvesting arrangement in accordance with an embodiment of the present invention.

Referring to FIG. 3(b), the transducer 302 can be modelled electrically as a resistance 304, inductance 306 and dependent voltage source 308 connected in series. The voltage ($V_e$) of the dependent source 308 is proportional to the velocity ($\dot{x}$) of the mass (M), shown in FIG. 3(a). Mechanically the transducer 302 is modelled as a force input $f_d$ whose value is proportional to the current (i) flowing in the transducer 302 and is described by the following Equations:

$$f_d - c_e = M\ddot{x} + B\dot{x} + kx \quad (4)$$

$$V_{Load} = c_e \dot{x} - iR_e - L_e \frac{di}{dt} \quad (5)$$

The dynamics of the load 310 are not explicitly described in this model. This degree of freedom is used, in accordance with an embodiment of the present invention, to determine the load characteristics that give the optimum transfer of energy from the mass system 300 to the load 310.

To determine the load characteristics, Equation (5) can be expressed as an optimisation problem of the form:

$$\max_{i(t)} \int_0^\infty i \cdot V_{Load} \, dt \quad (6)$$

For the purposes of testing, the mechanical force input to the system is in the form of a step force input ($f_d$) which is not unlike the vibration, or excitation, which could be expected if the system was attached to, or implanted in, a person walking at a set speed. Conveniently, if the system is initially at rest, a step magnitude of $\sqrt{2k}$ results in 1 Joule of work being done by $f_d$ once the system has reached equilibrium. A step force input is a simplified yet not unrealistic approximation to the excitation that a system of this type may encounter.

In accordance with an embodiment of the present invention, in order to optimise the energy transfer of the system the characteristics of the excitation are included in the optimisation.

Figure 3:
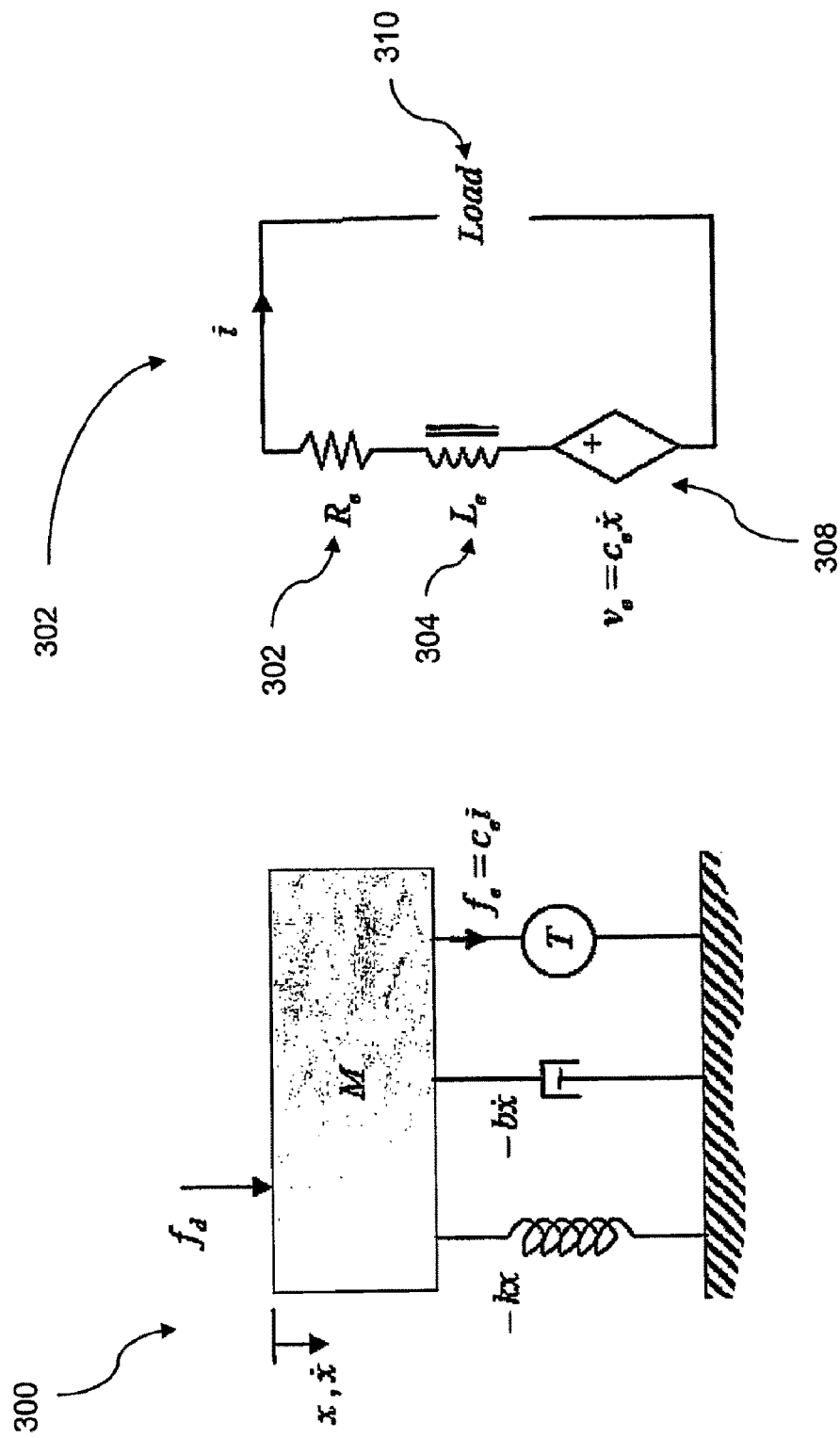
FIG. 3 is a force diagram and equivalent circuit for a transducer for converting energy from a vibrational energy source.
Figure 4:
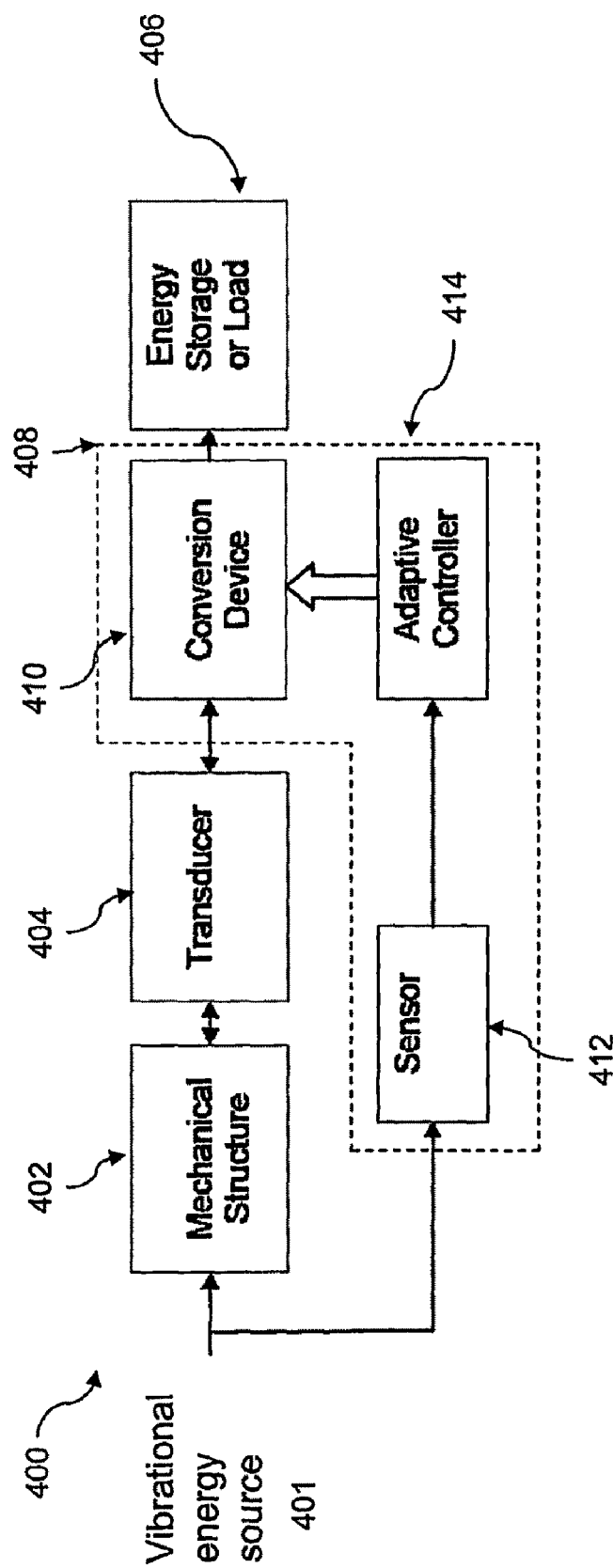
FIG. 4 is a block diagram of an apparatus for harvesting energy according to an embodiment of the present invention.

Turning to FIG. 4, there is shown an apparatus 400 for harvesting energy from a system such as shown in FIG. 3, in accordance with an embodiment of the present invention. The apparatus 400 harvests energy from a vibrational energy source, shown as input 401. Mechanical structure 402 and transducer 404 are arranged to convert mechanical energy received from the vibrational energy source into an electrical energy, for subsequent supply to the energy store or load 406. The transducer 404 may comprise, for example, an electromagnetic transducer or piezoelectric transducer. In an alternative embodiment, the transducer 404 may be an electroactive, electro-strictive or ionic polymer transducer. The apparatus 400 further comprises a harvesting arrangement 410 in accordance with an embodiment of the present invention, which is arranged to harvest the energy from the vibrational energy source 401. The harvesting arrangement 410 has a characteristic that may be varied in accordance with a varying energy characteristic of the vibrational energy source 401. The harvesting arrangement 410 in this example is an electrical conversion device 410 in the form of a rectifier 410 (which will be described later in more detail), and the characteristic of the rectifier 410 is impedance. The apparatus of this embodiment also includes a controller 414, in this example being an adaptive controller 414, for controlling the variation of the characteristic of the rectifier 410. The apparatus in this embodiment also includes a monitor 412 for monitoring the varying energy characteristic of the source to obtain one or more variation parameters which are utilised by the adaptive controller 414 to control the rectifier 410. In this example, the monitor is a sensor 412 in the form of a force transducer for sensing the vibrational force disturbance 401 and the variation parameter is magnitude of force. In an alternative embodiment, the sensor may be in the form of a laser Doppler vibrometer for measuring the velocity of the vibrational energy source. The rectifier 410 in this embodiment is a switching device capable of emulating the behaviour of arbitrary impedance but rather than dissipating energy, it transfers it to the energy storage (e.g. a battery) or load 406. In an alternate embodiment, the adaptive controller 414 may use the variation parameter to directly control load current instead of doing so indirectly through an emulated impedance.

The adaptive controller 414 operates in accordance with a reinforcement learning algorithm to control the rectifier 410. Over time this algorithm builds up a map between features of the energy input (disturbance) and the appropriate impedance required to maximise energy capture.

Figure 6A:
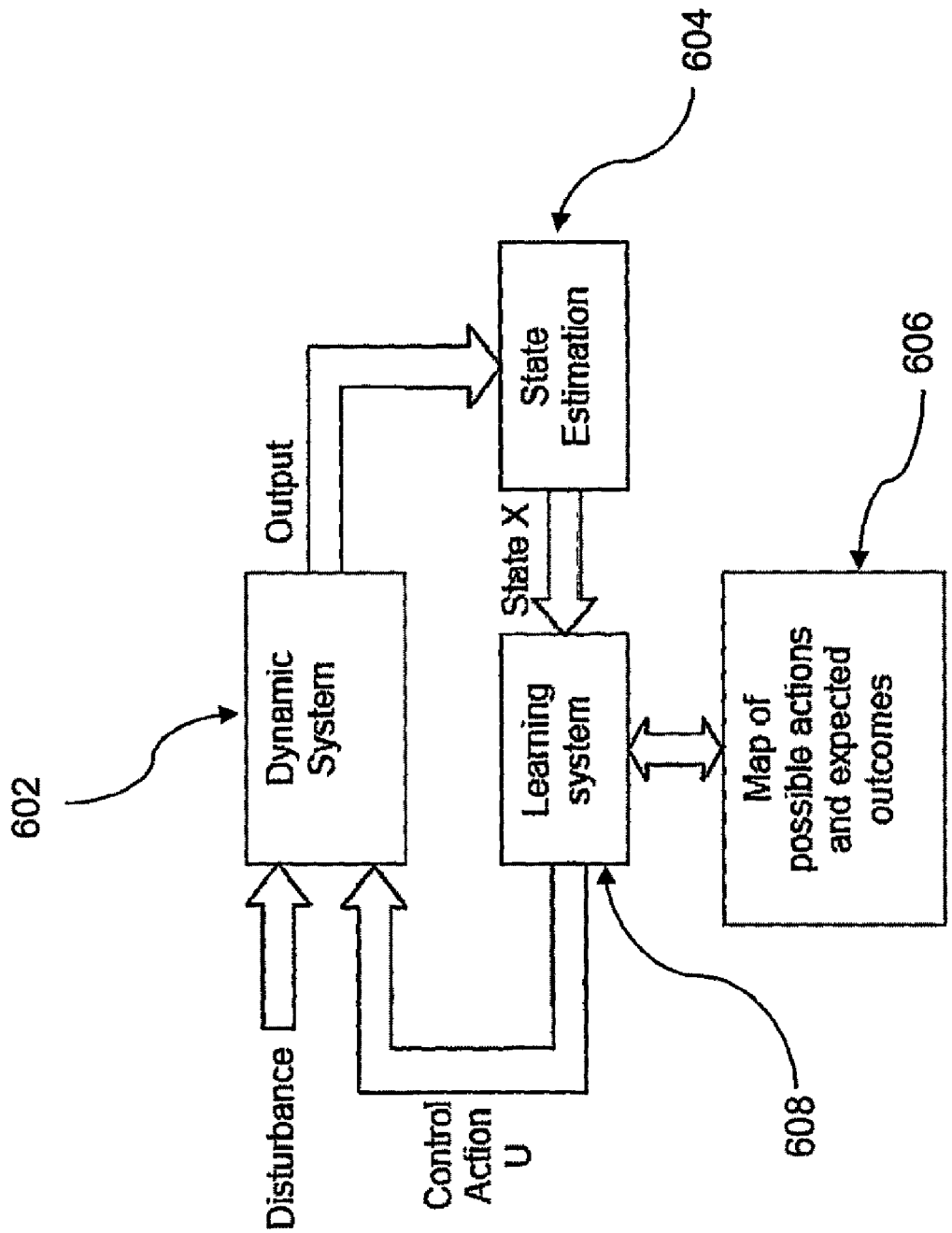
FIG. 6(a) is a schematic diagram illustrating an adaptive learning algorithm which may be utilised with the embodiment of FIG. 4.
Figure 6B:
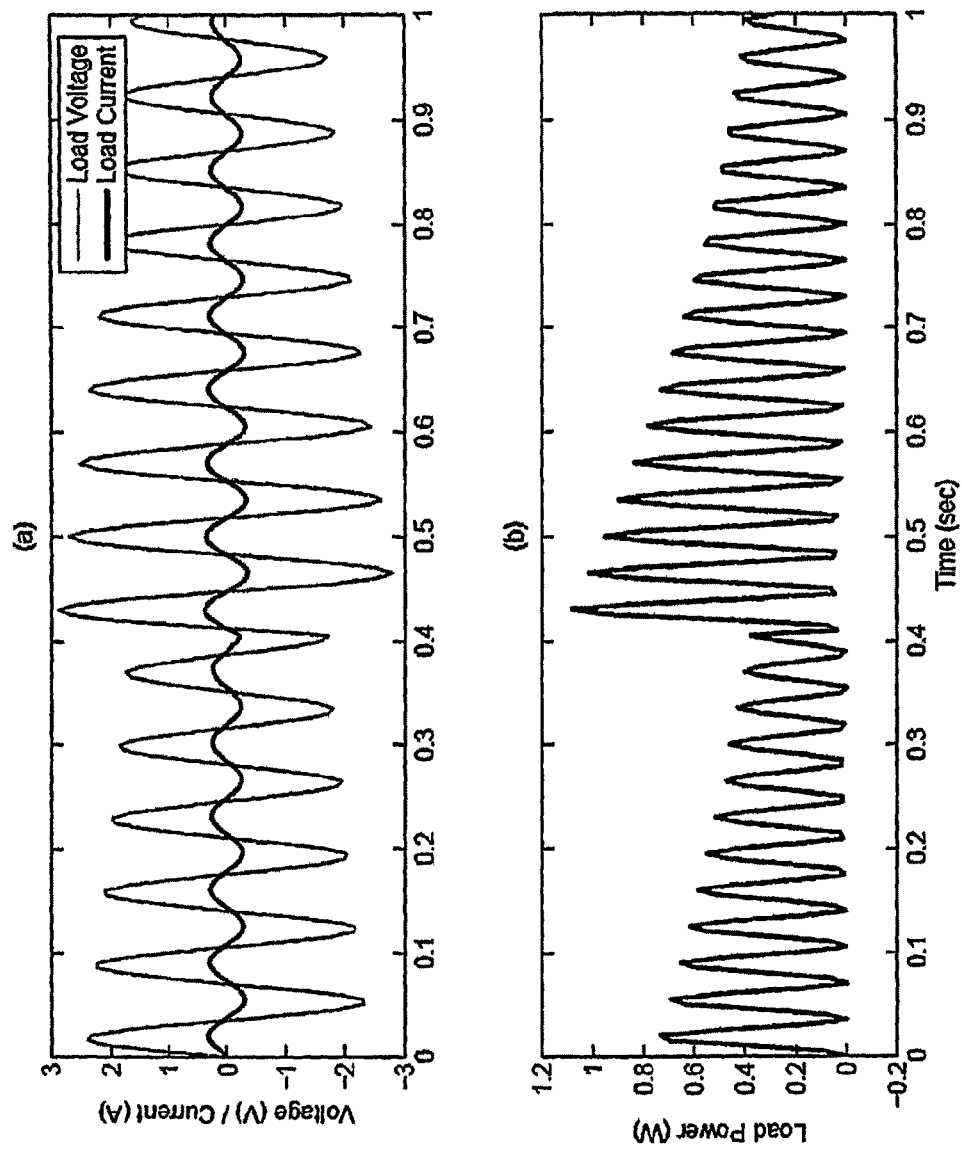
FIG. 6(b) shows current and voltage waveforms for the transducer of FIG. 4 for some example vibrations applied to the embodiment.

FIG. 6(b) shows resulting current, voltage and power waveforms for one example for a force step at times t=0 and t=0.4 seconds. Note that although the mechanical system is the same throughout this example, both the phase and magnitude of the current waveform changes with respect to the voltage waveform when the second step occurs. The reason for this change is that during the first step the system is configured to extract as much energy as possible before the next step arrives, while for the second step there is more time to absorb the energy, so energy can be extracted more slowly to improve efficiency.

A reinforcement learning system utilised by the adaptive controller 414 for controlling the rectifier 410 will now be described with reference to FIG. 6(a). The reinforcement learning system includes four key components.

The first of these components is the dynamic system block 602. The dynamic system block 602 represents the whole energy conversion system (i.e. the mechanical structure 402, transducer 404 and harvesting rectifier 410). Effectively, the dynamic system block 602 can be thought of as a box where vibrations go in, energy comes out and whose characteristics can be varied to alter system performance. The dynamic system block output is a function of: (a) the current characteristic information; (b) the impedance value of the harvesting rectifier chosen at this instant in time; (c) the system state, which encapsulates information on the history of the system. The output function is passed to the state estimation block 604.

The state estimation block 604 contains information about the current state of the dynamic system. According to this embodiment, only state information that is needed for determining the desired harvesting rectifier impedance is considered (or in some instances inferred), so that the dimensionality of the learning map (which will be described later) is minimised. For example, for the basic capacitor circuit described earlier, the only state information needed to know the optimal impedance is the estimated time to the next energy pulse (i.e. a single state variable). Alternatively, if it was established that the capacitor was exhibiting a non-linear output for different voltages, it would also be important to include an estimate of the capacitor voltage in the state information. According to the present embodiment (i.e. a step force input), it is important to know when the next step (or disturbance) might be expected. With reference to FIG. 6(b), there can be seen the resulting waveforms where a step force was experienced at t=0 and t=0.4 seconds. Note that although the mechanical system is the same throughout this example, both the phase and magnitude of the current waveform changes with respect to the voltage waveform when the second step occurs. The reason for this change is that during the first step, the system is configured to extract as much energy as possible before the next step arrives, while for the second step there is more time to absorb the energy, so that energy can be extracted more slowly to improve efficiency.

Shown at block 606 is a learning map. The learning map 606 can be conceptualised as a lookup table, where, based on the current state information and each control action that needs to be considered at a certain time (i.e. setting the harvesting rectifier impedance), the expected consequences of that action (i.e. total energy recovered from the energy pulse) can be referenced.

The last component shown in FIG. 6 is the learning system block 608. The learning system block has two main tasks: (a) to provide the appropriate control action to achieve the desired outcome (i.e. setting the impedance of the harvesting rectifier 410); and (b) to build up and maintain the map of the system behaviour that will allow it to perform (a). To perform the control action, the adaptive controller 414 references the learning map 606 to evaluate the expected outcomes of different control actions and selects the one which produces the optimal energy transfer. In other words, the adaptive controller 414 exploits knowledge of the system to achieve the optimal outcome. However, in order to build up the map 606, it is necessary to explore the outcomes of different control actions. Furthermore, in order to adapt to changes in the system, the learning system 608 needs to occasionally re-explore areas of the map 606 where information has not been updated for some time. This means that there is a trade-off where exploratory control actions (which provide the information needed to keep the map up to date) must be balanced with the desire to continually perform the best actions. According to this embodiment, each pulse of energy can be thought of providing an experiment where the outcome is defined by the amount of energy that is extracted. It is important to note however, that the reiterative learning system treats each time step (apply a control action, measure the resulting state) as an individual experiment and can evaluate the success of that control action by the expected outcome from the resulting state. The practical implication here is that this allows the learning system 608 to generate any number of adaptive learning algorithms for optimizing the energy transfer. In this manner, the learning system 608 may piece together different parts of many experiments to arrive at the optimal strategy, rather than having to try out every possible combination.

Figure 5A:
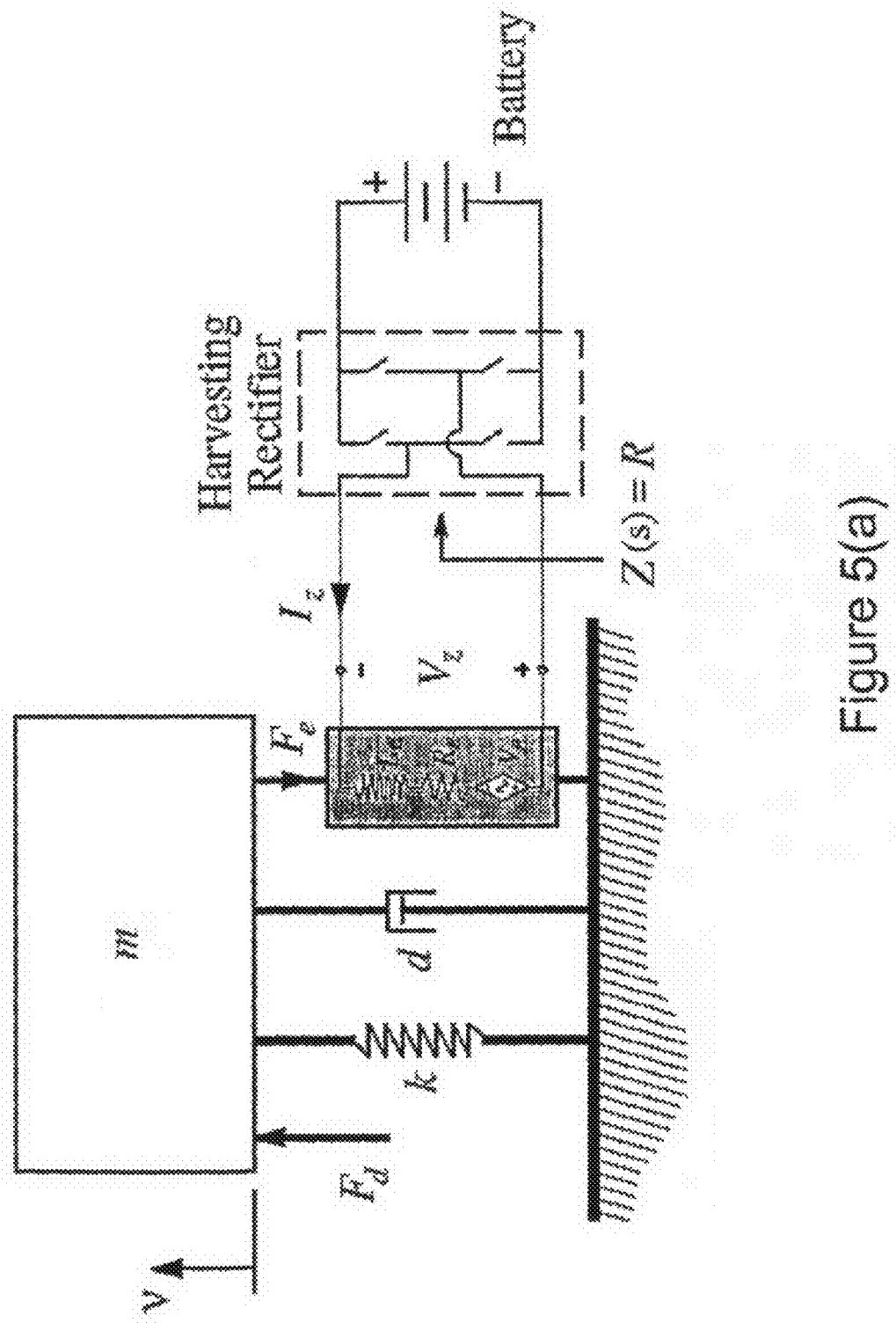
FIG. 5(a) is a diagram of an electromechanical system coupled to a harvesting rectifier in accordance with an embodiment of the present invention.
Figure 5B:
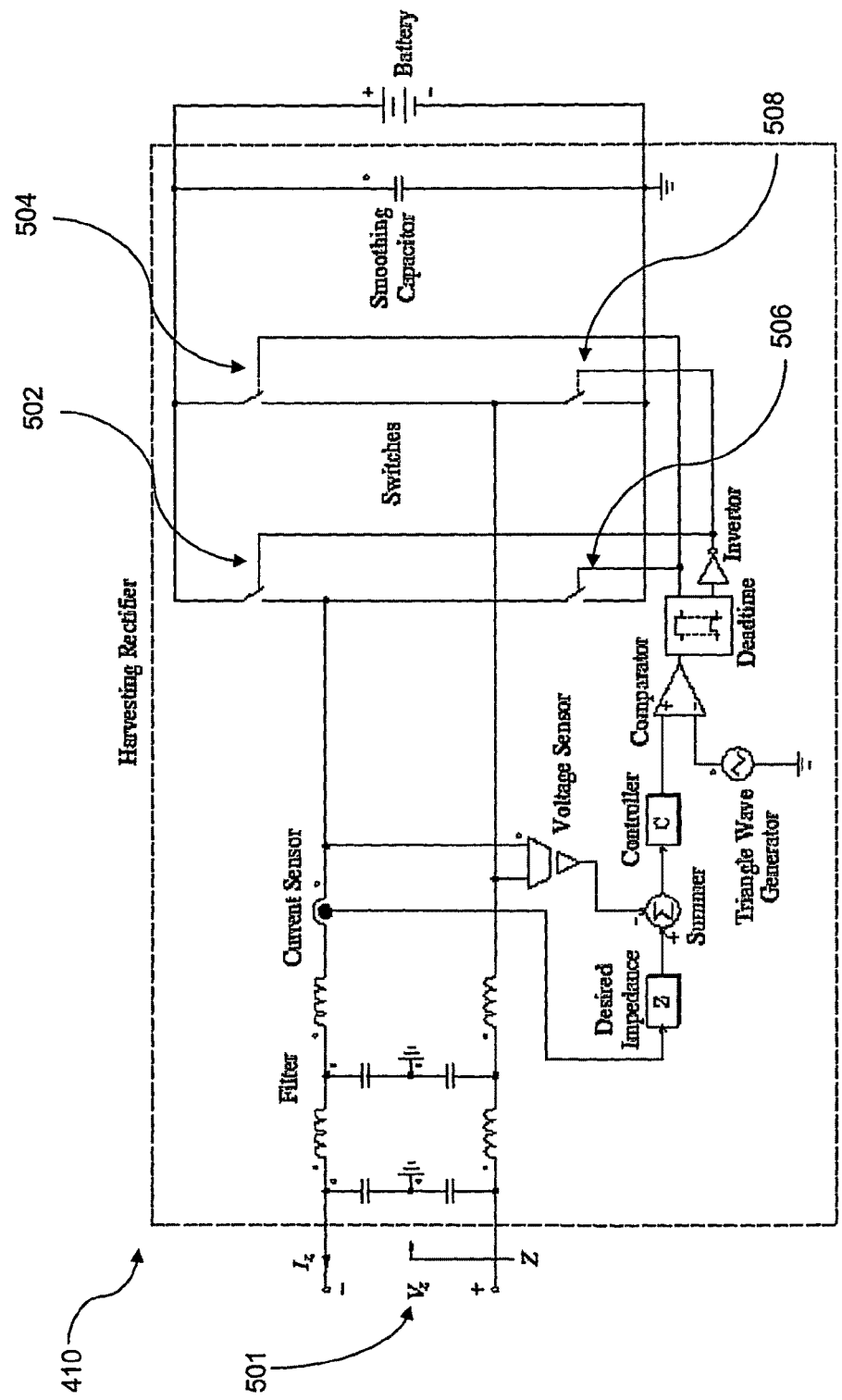
FIG. 5(b) is a circuit diagram of a harvesting rectifier according to an embodiment of the present invention.

Operation of the harvesting rectifier 410, in accordance with this embodiment, will now be described with reference to FIGS. 5(a) and 5(b). The device is capable of implementing any arbitrary impedance seen at its input terminals. For example, an arbitrary impedance Z(s) (where 's' represents the Laplace transform or jω) can be established at the terminals by either sensing a current and applying a voltage, or sensing a voltage and applying a current. In other words, the device can be thought of as a current controlled voltage source (with voltage feedback) where a required impendence needs to be implemented at the input terminals, or a voltage controlled current source (with current feedback) where an admittance is to be implemented at the input terminals. In a particular embodiment, as shown in FIG. 5(b), the harvesting rectifier 410 consists of four switches 502, 504, 506, 508 which switch on and off at very high frequencies. By changing the on-off time of the switches the harvesting rectifier 410 maintains an arbitrary relationship between voltage and current at its input terminals 501 and resulting synthetic/virtual impedance can be established at its input terminals 501. In addition to the four switches 502, 504, 506, 508, the harvesting rectifier 410 further consists of:

Filter—smooths (or filters) electrical currents entering or exiting the harvesting rectifier when the switches turn on-off.

Current Sensor—senses the electrical current entering or exiting the harvesting rectifier.

Voltage Sensor—senses the electrical voltage across the terminals of the harvesting rectifier.

Desired Impedance—is the desired impedance seen at the terminals of the harvesting rectifier. This could be implemented using an analogue or digital filter. Note that the filter could be linear or non-linear.

Summer—sums the sensed electrical voltages or currents signals.

Controller—the controller controls the on-off, or duty cycle1, for the switches.

Comparator—the output of a comparator is on (or 1) when the non-inverting input is higher than the inverting input. When the positive input is lower, the output is off (or 0). If the two inputs are equal, the output is undefined and therefore it will output the previous value.

Triangle Wave Generator—generates a triangle wave for the comparator. A triangle wave is a waveform named for its triangular shape.

Invertor—the output is the inverse of the input.

Deadtime—prevents the circuit from having shot through i.e. prevent the switches from turning on at exactly the same time.

Switches—switches conducts current in both directions. It is on when the gating is high, and is off when the gating is low, regardless of the voltage bias conditions of the switch.

Smoothing Capacitor—smooths (or filters) switching currents generated by the switches turning on-off.

In an alternate embodiment (not shown), the harvesting rectifier can be configured to implement an impedance Z(s) using a desired admittance $$Y(s)=1/Z(s). \quad (7)$$

This may be beneficial where it is difficult to implement a desired impedance using an analogue or digital filter with an improper transfer function e.g. inductor or differentiator.

Figure 7A:
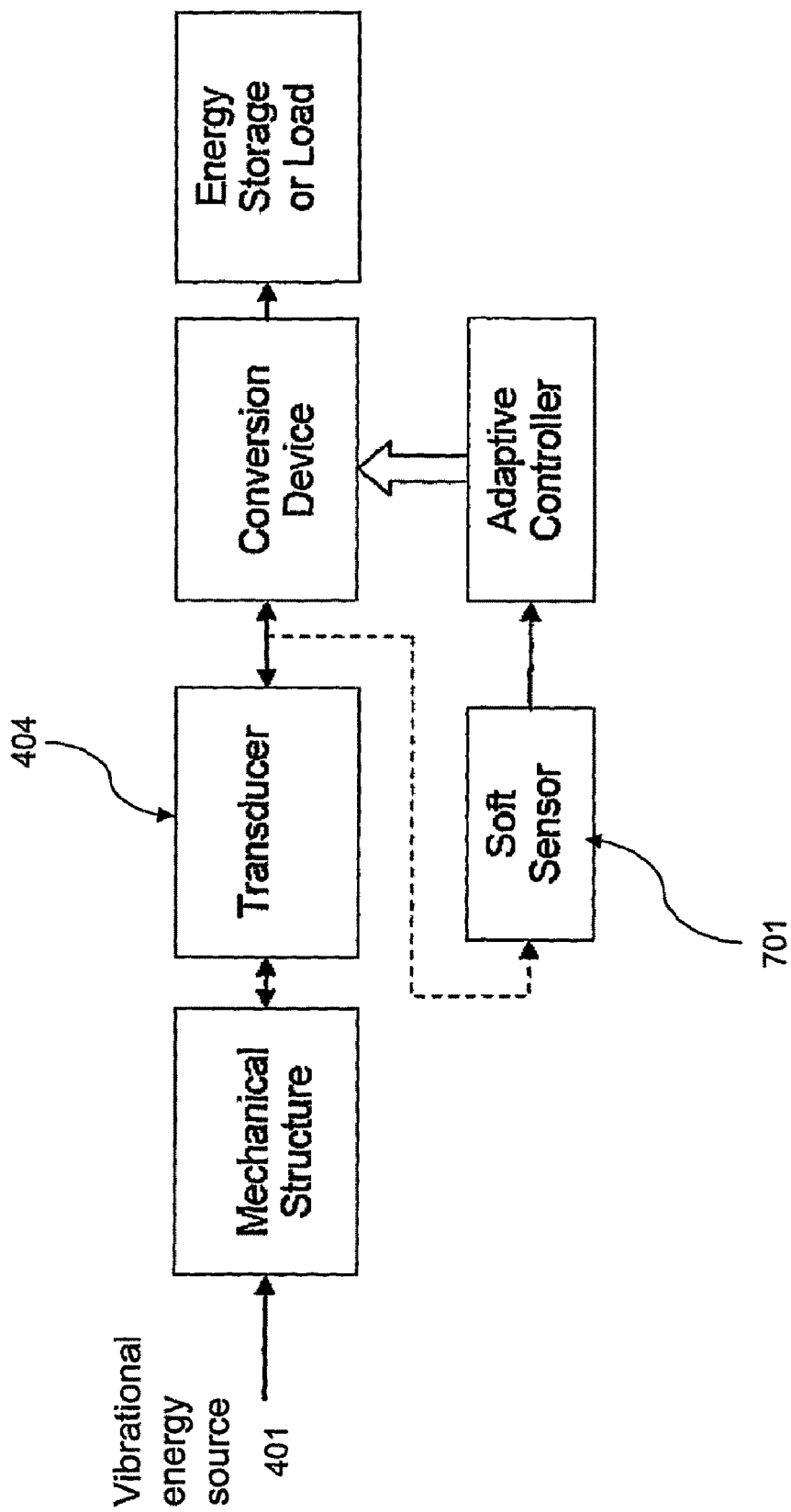
FIG. 7(a) is a block diagram of an apparatus for harvesting energy in accordance with a further embodiment of the present invention.
Figure 7B:
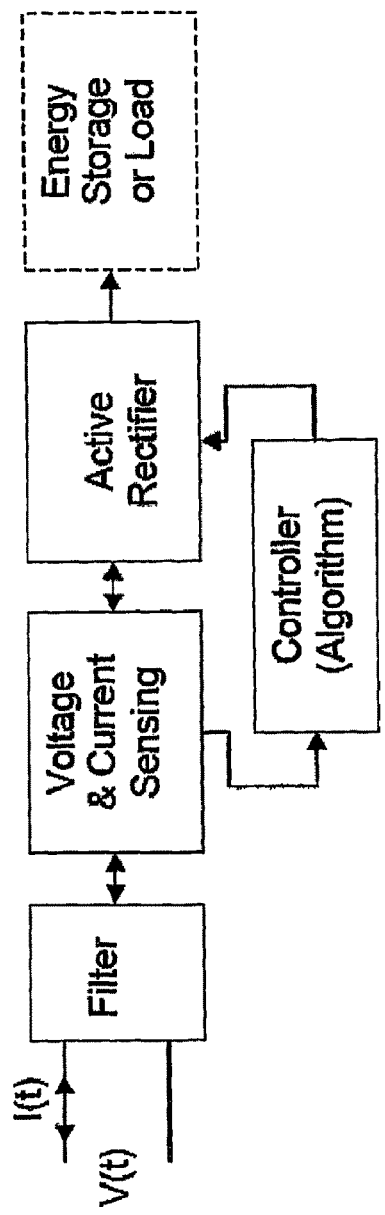
FIGS. 7(b) and (c) show block diagrams of alternative configurations in accordance with embodiments of the present invention.

In the embodiment of FIG. 4, the varying energy characteristic is directly determined by the disturbance measuring sensor 412. An alternative is to measure the output from the transducer 404 (i.e. in terms of the voltage/current output) and utilise this measure to infer characteristics of the energy input disturbance rather than having to measure it directly. An alternative embodiment which utilises a "soft sensor" 701 to measure voltage or current from the transducer 404 is illustrated in FIG. 7(a). The other components of the FIG. 7(a) embodiment are the same as those of FIG. 4 and no further description will be given here. FIG. 7(b) is block diagram of a system implementation described above in relation to FIG. 5. In this case, the variation parameters are voltage and current measured from the transducer. The voltage and current values are fed into the controller algorithm which determines the configuration of the harvesting rectifier necessary to optimise performance.

Figure 7C:
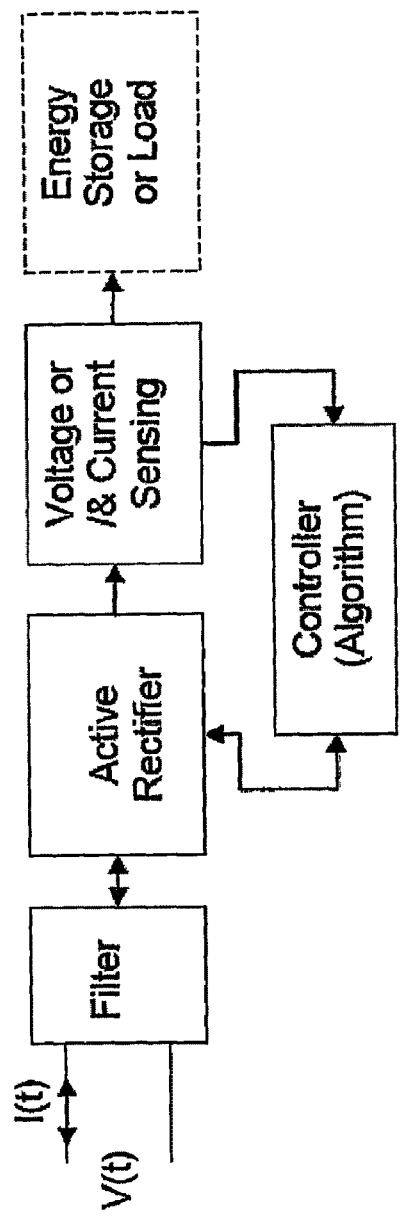

In the arrangement of FIG. 7(c), measurements are taken the load side of the harvesting rectifier.

Both these configurations of sensors have different features. The advantage of performing sensing on the transducer side of the harvesting rectifier is that these measurements more directly relate to the conditions of the vibrating structure. Using measurements on the load side of the rectifier, however, provides direct measurement of the extracted energy and so makes it easier to configure the adaptation and better allows losses in the switching system to be accounted for in the learning process. A combination of these two approaches may be utilised.

Figure 8:
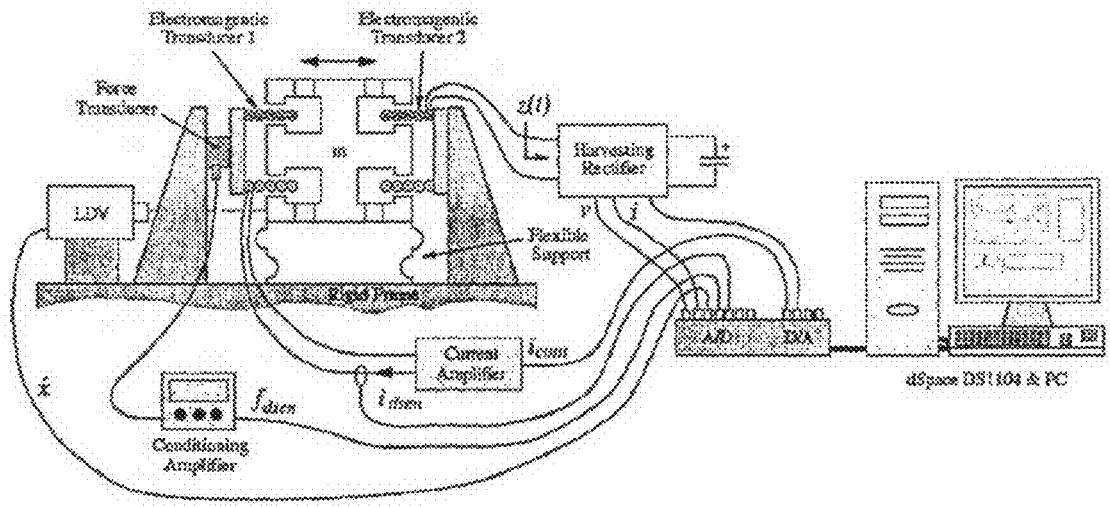
FIG. 8 is a schematic representation of an experimental set up.

An experimental apparatus was built to test the proposed technique of vibration energy harvesting. The apparatus included a laser doppler vibrometer (LDV), rigid support, flexible supports, mass and two identical electromagnetic transducers (or speakers). FIG. 8 shows a section view of the experimental apparatus. The table below lists the experimental apparatus parameters.

TABLE experimental apparatus parameters.

| Parameter | Symbol | Value | Unit |
|---|---|---|---|
| Mass | m | 11 | kg |
| Damping Coefficient | b | 14.3 | Ns/m |
| Spring Coefficient | k | 87.1 | kN/m |
| Coil Inductance | Le | 1.9 | mH |
| Coil Resistance | Re | 3.4 | Ω |
| Coupling Coefficient | $c_e$ | 8.3 | N/A or V/ms$^{-1}$ |

In order to measure the experimental apparatus conversion efficiency η, i.e. the energy out $E_{out}$, divided by energy in $E_{in}$, we need to measure the disturbance force $f_d$ (or $f_{dest}$), mass velocity ẋ, and 'harvesting rectifier' current i and voltage v.

A dSpace DS1104 system generated a current control signal $i_{cont}$ and measured the disturbance force $f_{dsen}$, mass velocity ẋ and 'harvesting rectifier' current i and voltage v. By applying a step disturbance current $i_{dsen}$ to the electromagnetic transducer 1, a disturbance force $f_{dest}$ can be estimated i.e. $f_{dest}=c_e i_{dsen}$. A disturbance force $f_{dsen}$ was directly measured using a PCB Piezotronics 218C force transducer through a Nexus 2692 conditioning amplifier, with a high-pass filter of 0.1 Hz. The sensed disturbance force $f_{dsen}$ magnitude could then be compared against $f_{dsen}$ as a means of verifying the estimation. Mass velocity ẋ of the mechanical system was measured using an Ometron VH-1000-D laser doppler vibrometer (LDV) and was used to determine the experimental apparatus parameters i.e. k and b. The experimental apparatus set up is depicted in FIG. 8.

By applying a step disturbance force $f_d$=8.3N (or $E_{in}=f_d^2/(2k)$=0.395 mJ) to the model, the harvesting rectifier adapts such that it maximise the efficiency of converted energy.

Figure 9:
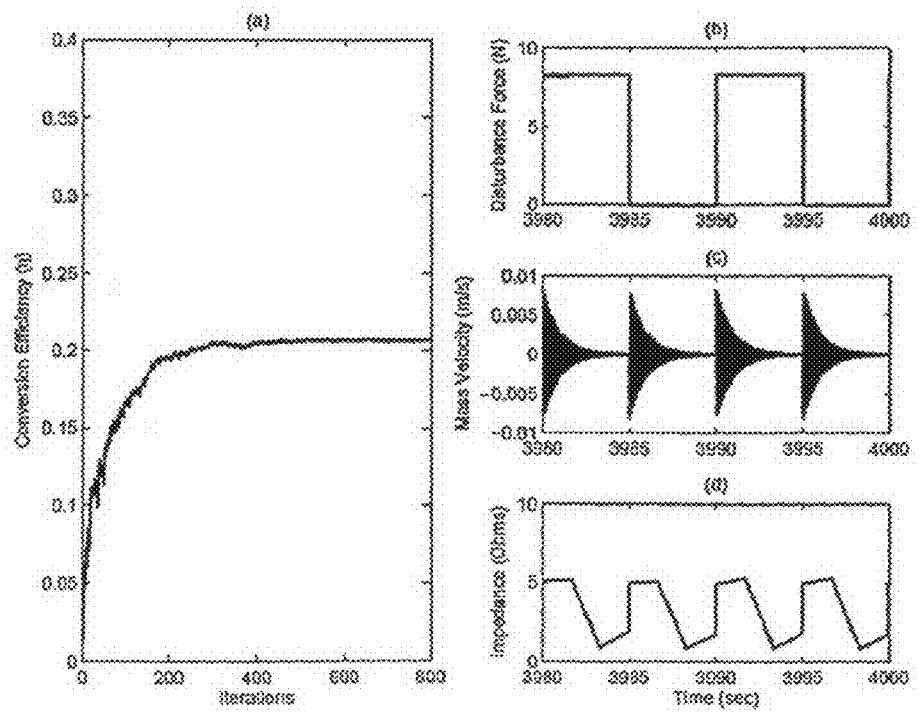
FIG. 9 shows plots produced from a simulated model of the experimental set up of FIG. 8 with 5 second periods.

FIG. 9 shows the simulated model results for the harvesting rectifier subjected to a step disturbance force with a period of 5 seconds. The conversion efficiency (η) is displayed in plot (a) which reveals that after a number of iterations the system converges to an optimal conversion efficiency of 0.21, i.e. 21%. Plots (b), (c) and (d) in this Figure show the disturbance force $f_d$, the mass velocity ẋ and the impedance z(t) respectively, as functions of time. It can be seen that in each period the velocity of the mass decays to zero and the impedance changes accordingly algorithm to ensure optimal conversion efficiency, as shown in FIG. 9(d).

Figure 10:
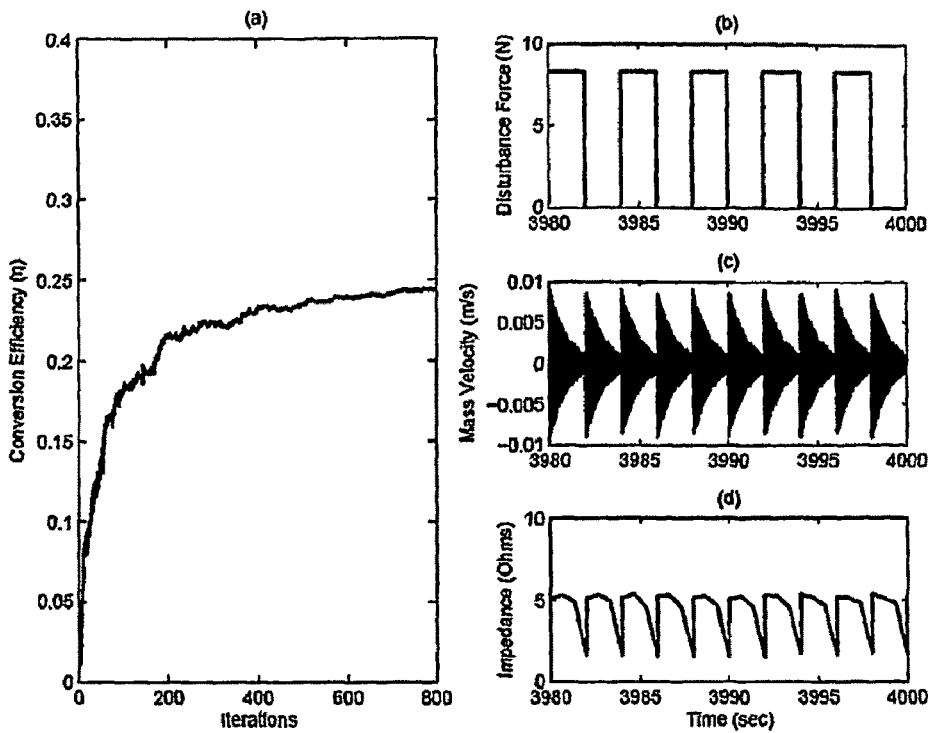
FIG. 10 shows plots produced from a simulated model of the experimental set up of FIG. 8 with 2 second periods.
Figure 12:
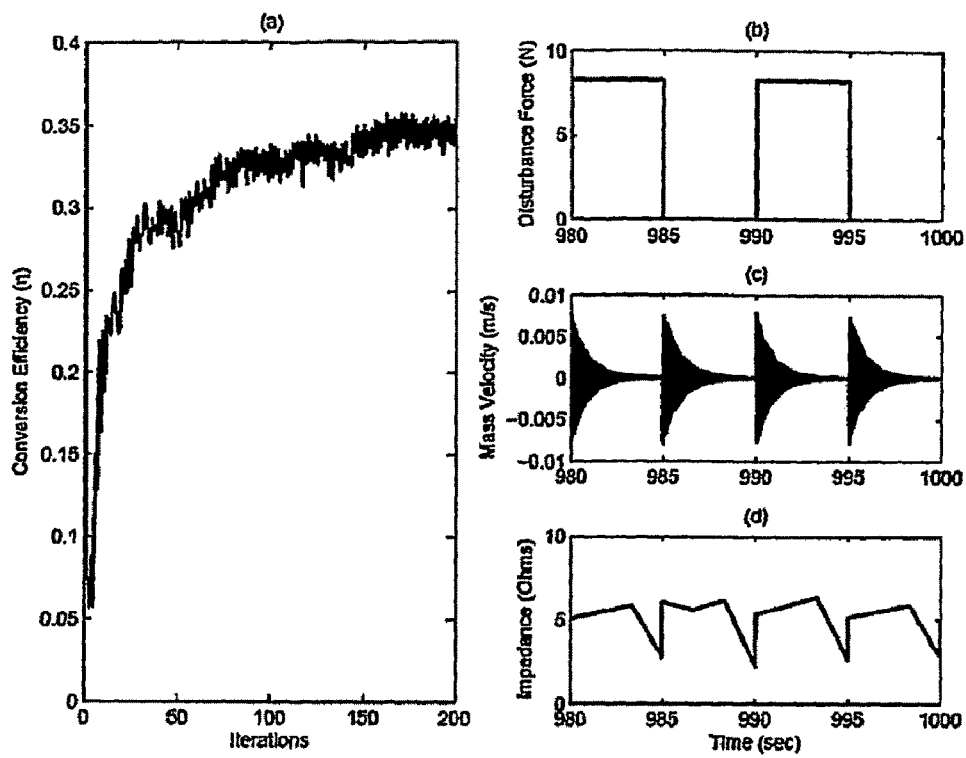
FIG. 12 shows plots produced from the experimental set up of FIG. 8 with 5 second periods.

FIG. 10 then shows the results from the same simulation run with the period of the step disturbance force $f_d$ set at 2 instead of 5 seconds. Owing to the faster period of the step force, the mass velocity ẋ does not completely decay for each period. Also, the impedance needs to updated 'faster' on a time scale, as shown in FIG. 12(d). The efficiency is seen to converge to an optimal value of 0.24 (i.e. 24%), which is slightly higher than for the 5 second case.

The simulation was then repeated, however, this time the step disturbance force was changed intermittently between 2 and 5 seconds. The results from this are displayed in FIG. 11.

Figure 13:
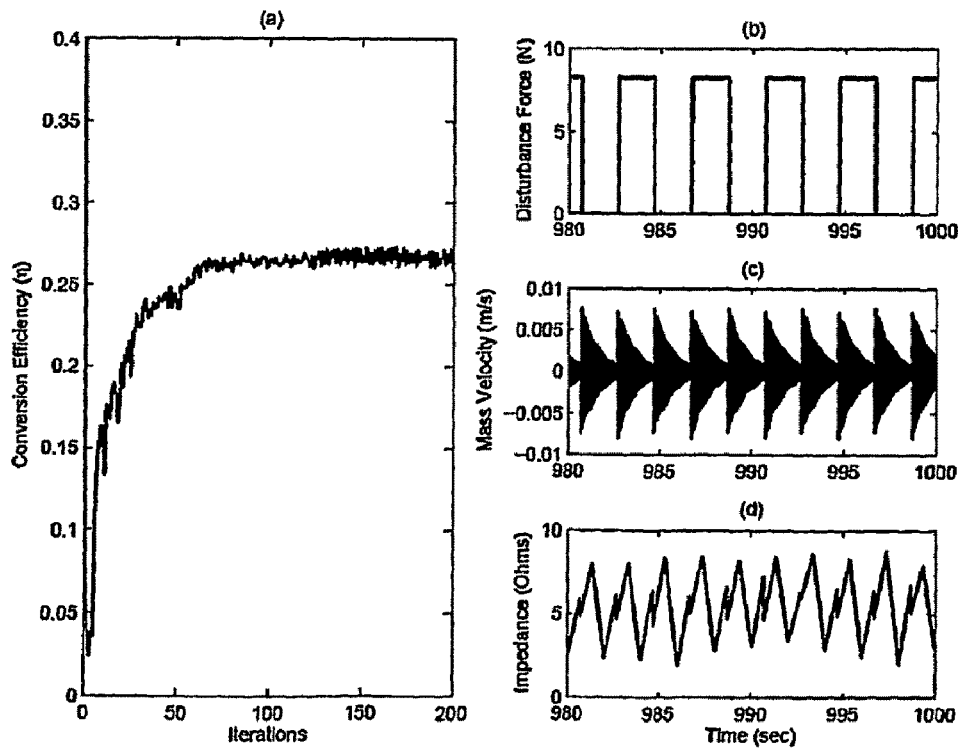
FIG. 13 shows plots produced from the experimental set up of FIG. 8 with 2 second periods

Using the same procedure as described in the previous section, a $f_d$=8.3N step disturbance force was applied to the experimental apparatus for 5 and 2 second periods, and intermittently 2 and 5 second periods. Experimental results for these three scenarios can be seen in FIGS. 12, 13 and 14 respectively.

From the results, we can observe both the simulations and experimental apparatus converge to an optimal conversion efficiency of 27-34%. We also notice the load impedance z(t) for the harvesting rectifier learns and adapts to changing disturbance, and is fast changing.

Additionally, the experiential apparatus conversion efficiency results are slightly larger (i.e. by 6-10%) and optimal impedance z(t) is considerably different than the simulations. The inventors believe this is attributed to the additional dynamics and off-sets for the experimental system. This is a positive outcome, as this demonstrates the proposed learning technique can compensate for changing operating and environmental conditions.

Figure 15:
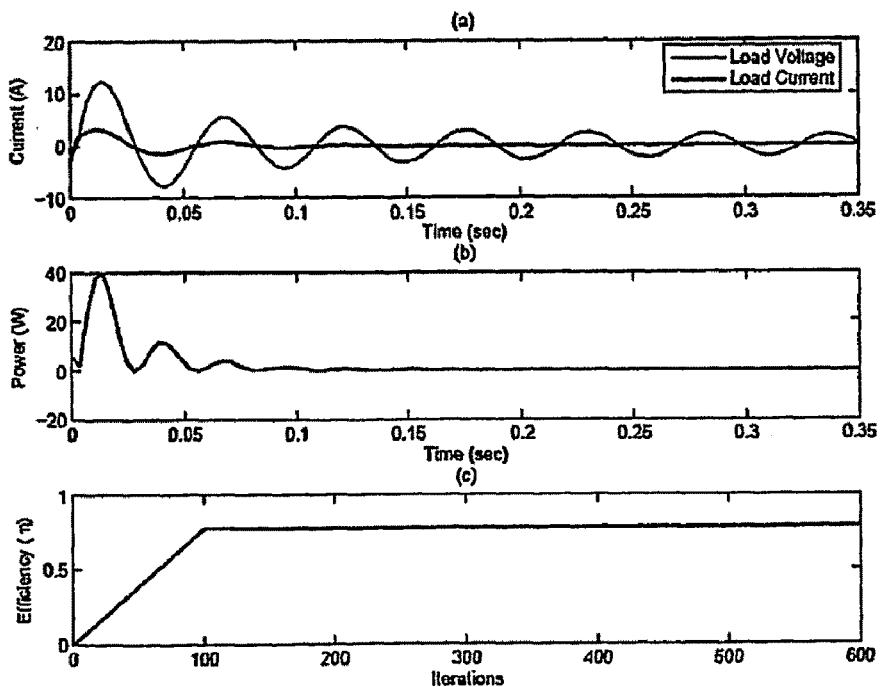
FIG. 15 shows plots produced from a simulated model of the experimental set up with an alternative electromagnetic transducer.

It was also observed that the vibration energy harvesting system had a conversion efficiency of 10-17%. This can be attributed to the efficiency of the electromagnetic transducer and relative large damping of the vibration system. However, if we apply the above concepts to a more efficient electromechanical system such as a QDrive STAR Linear Motor/Alternator 1S362M/A, simulations suggest that energy conversion efficiencies of greater than 80% could be achieved, as shown in FIG. 15.

Figure 16:
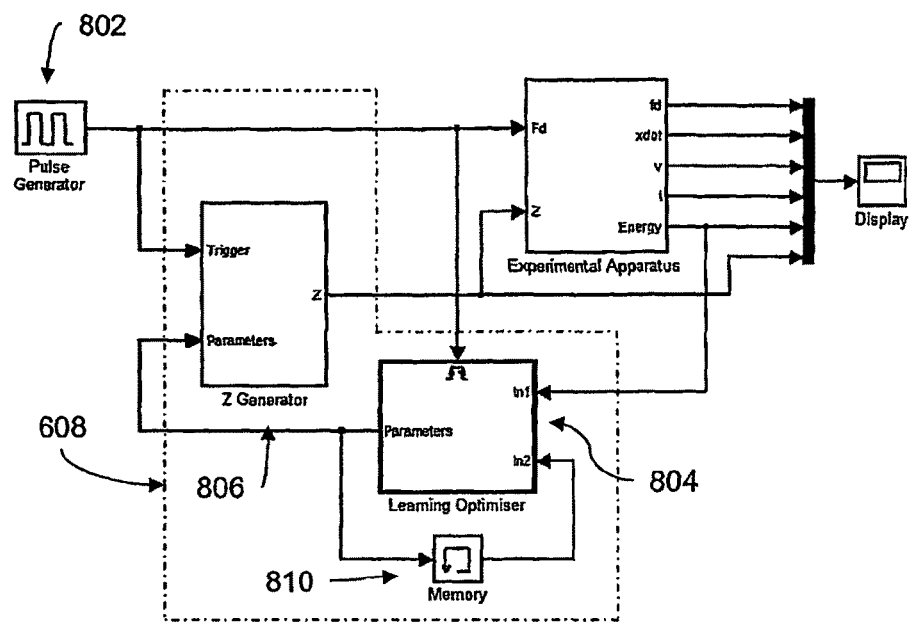
FIG. 16 is a block diagram of a laboratory scale system for illustrating operation of the adaptive controller, in accordance with an embodiment of the present invention.

An example implementation of the adaptive controller for the above-described experimental apparatus can be described with reference to the Matlab/dSpace block diagram of FIG. 16. For this example system, the mechanical system is excited by a pulse generator 802 (with varying frequency) allowing the learning system block 608 to treat each pulse as a discrete experiment. The calculation of optimised parameters is performed once per pulse. Learning algorithms generated by the learning system block 608 produce the (time varying) optimal virtual impedance Z, i.e. z(t), for the harvesting rectifier. For this example system, the experimental apparatus is setup with the following inputs:

Fd—the exogenous forcing function that excites the mechanical system; and

Z—the time varying impedance that the learning algorithm determines in order to maximise energy capture.

The response of the experimental apparatus is obtained using measurements from a force transducer (fd), laser doppler vibrometer (xdot) and voltage (v) & current (i) transducers. In embodiment described herein, the learning system block 608 implements one learning algorithm which utilises only the energy output from the experimental apparatus—this is derived directly from output voltage and current and is obtainable using low cost sensors. The velocity and force measurements are obtained in the laboratory system to allow full analysis of system dynamics and conversion efficiency but need not be included in further implementations. In the diagram, the learning system 608 is separated into two sub-systems, namely a learning optimiser block 804 and Z generator 806.

The learning optimiser block 804 builds up a learning map of optimal behaviour for the different classes of excitation that the mechanical system is subjected to. The learning map is updated once per pulse. The memory block 810 is shown to make it explicit that the learning map update is a function of the previous state of the learning map and the new data that has just been obtained for the current pulse.

The Z generator 806 takes the updated learning map from the learning optimiser block 804 and uses it to produce the time varying impedance for the harvesting rectifier. For this specific example, the learning map represents the optimal harvesting rectifier impedance, as a function of time and excitation frequency. The learning map is implemented as a matrix with rows representing time (within each excitation pulse), columns corresponding to pulse frequency and the matrix value being the optimal harvesting rectifier impedance under these conditions. As there are only a discrete number of rows/columns in the learning matrix, parameters must be interpolated to obtain the impedance value at data points between those explicit in the matrix. This is an important step for reducing the computational complexity of the implementation.

Figure 17:
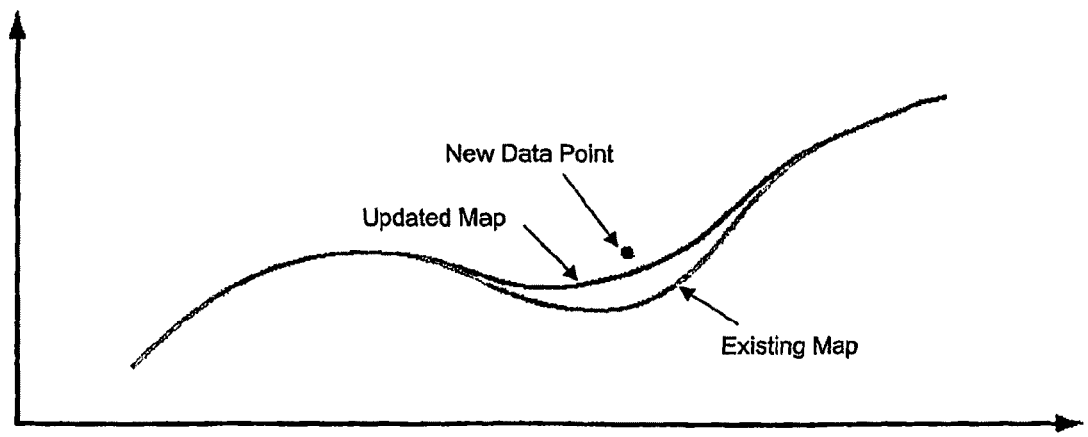
FIG. 17 shows a one dimensional plot produced by the adaptive controller.

The machine learning method used is based on 'Q-learning' which is a reinforcement learning technique readily know to persons skilled in the art. This provides the machine learning framework that allows convergence to an optimal solution over many experiments. The method has been altered slightly since the learning map is actually a discrete approximation to the underlying continuous map. As such, new data points almost never lie directly on matrix coordinates, but rather new learning data must be 'smeared' across adjoining parameters. This is illustrated in FIG. 17, for a one dimensional learning map. In the experimental system, the weighting function used to 'smear' the new data is a triangle. Other appropriate functions are well known within the signal processing community.

Figure 11:
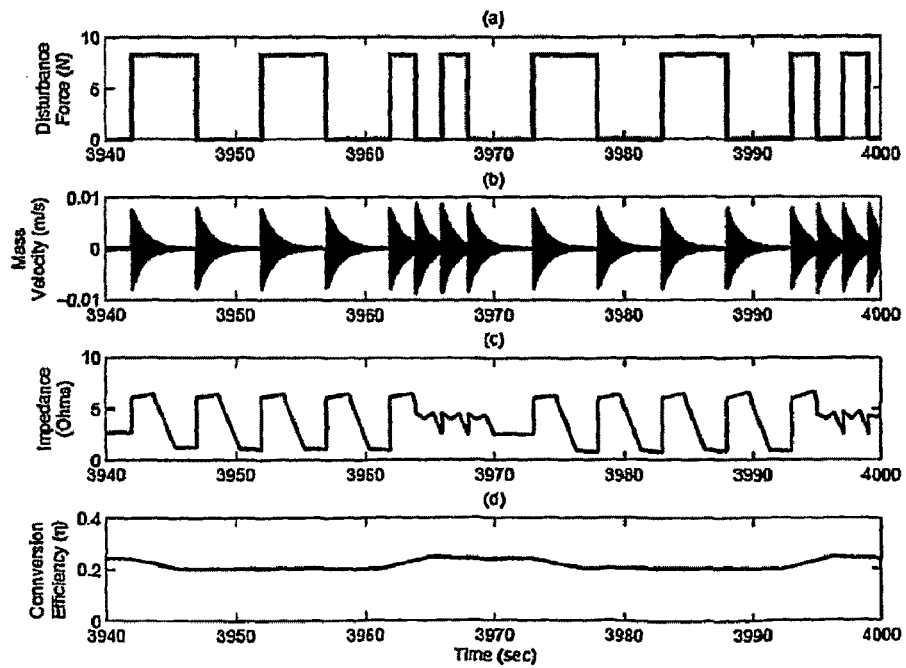
FIG. 11 shows plots produced from a simulated model of the experimental set up of FIG. 8 with intermittent 5 and 2 second periods.
Figure 14:
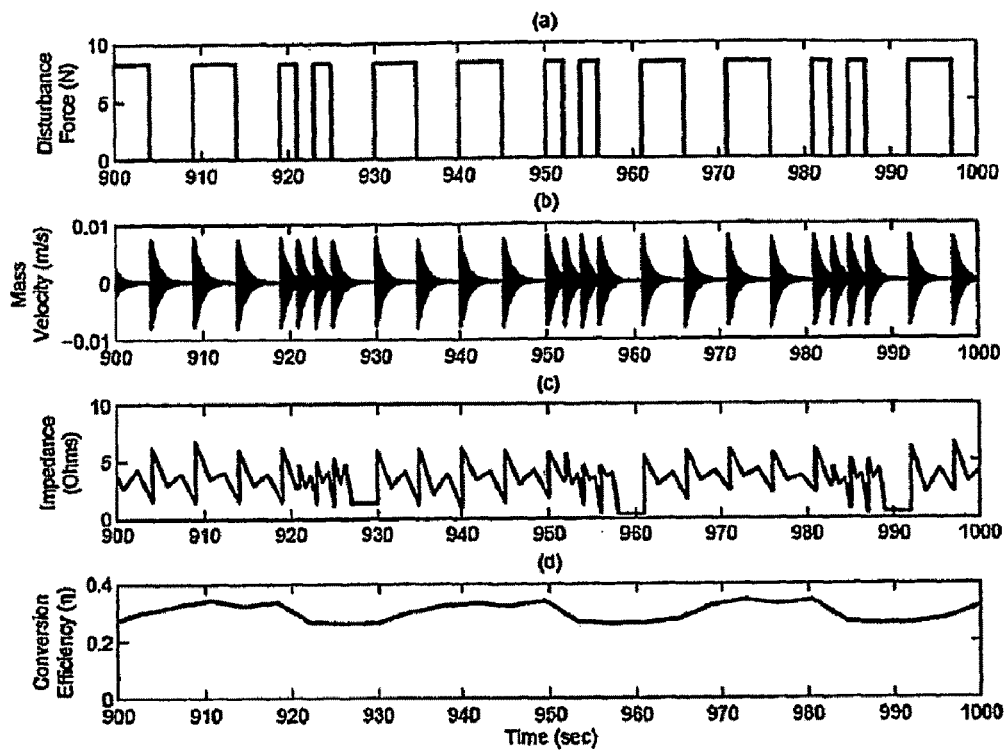
FIG. 14 shows plots produced from the experimental set up of FIG. 8 with intermittent 5 and 2 second periods.

The Z generator block 806 takes the learning map as generated by the learning optimiser to finally generate the actual harvesting rectifier impedance. Results for this example system are shown in FIGS. 11 & 14. From FIGS. 11 & 14 it can be seen that, when the input excitation changes, the reinforcement learning algorithm is able to immediately reconfigure itself to the previously learnt optimal configuration. This is in contrast to adaptive optimisation type approaches of conventional systems, where the optimisation has to be recalculated every time there is a change in the system. The reinforcement learning algorithm achieves this by building up a map of previous experiences, which is called upon any time a new operating point is required.

Embodiments of the present invention may have many applications. These may include the transfer of energy from a vibrational energy source to an energy storage device, such as a mobile phone battery. A harvesting rectifier uses a high speed switching circuit for capturing the energy and transferring it to the energy storage device in an optimal time period. Another application of the present invention may be to transfer energy from vibrations created in large structures, such as for example, bridges, buildings, car suspension or other mechanical systems. Another application is for the transfer of energy from a person walking or running to instruments being carried by the person e.g. a soldier in the field. Other applications include:

Micro Electronic Mechanical Systems (MEMS) (medical pressure sensors etc), Nano Electrical Mechanical Systems (NEMS) and any other electrical systems which may be implanted in and powered by a patient's movement, rather than a battery which would eventually require replacement;

Wireless devices—sensors, keyless systems and radio frequency identification devices;

Harvesting energy from vibration turbines, as proposed in the Australian provisional patent specification no. 2006906804 by the present applicant and entitled "Harvesting Energy From Fluid Flow";

Solar Cells and/or Photovoltaics;

Portable Electronic Devices—mobile phones, personal digital assistants, digital cameras and portable music players;

Laptop Computers;

Transport Vehicles—motorbikes, cars, trucks, busses, trains and airplanes;

Civil Structures—houses, high-rise buildings and bridges;

Wave energy—ocean, rivers and streams; and

Thermoelectric devices.

There are many other applications.

Computing technology may be used to implement embodiments of the present invention. In particular the adaptive controller may be implemented by a computing system. The computing system may have any convenient architecture. For example, the implementation may include a microcontroller embedded into a device, the microcontroller being programmed with the appropriate adaptive learning algorithms. Alternatively, the implementation may include an appropriately programmed laptop computer, or any other computer architecture.

While the above described embodiments related to harvesting energy from vibrational sources, it is also envisaged that the present invention would equally be suitable for other systems including, but not limited to, thermo-acoustics (where the vibrations are heat driven); energy storage in a rotating flywheel; and hydroelectric systems. It is also envisaged that the present invention may be utilised to extract energy from broadband or random energy sources, such as noise sources etc.

It should also be understood that although an impedance matching circuit was utilised in the embodiment described, the present invention could equally operate with an admittance switching circuit whereby a voltage is measured and a current is applied.

In the above embodiment, the vibration energy is extracted by converting it to electrical energy. The present invention is not limited to the conversion to electrical energy. Energy may be converted to other forms e.g. captured energy may be used to directly compress a gas-constantly variable transmission may be connected to the compression mechanism. The constantly variable transmission operates as the "variation characteristic".

While the present invention has been described with reference to the aforementioned embodiments, it will be understood by those skilled in the art that alterations, changes and improvements may be made and equivalents may be substituted for the elements thereof and steps thereof without departing from the scope of the present invention. In addition, many modifications may be made to adapt to a particular situation or material to the teachings of the present invention without departing from the central scope thereof. Such alterations, changes, modifications and improvements, although not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the independent claims.

The invention claimed is:

1. A method of harvesting energy from a vibrational energy source having a varying energy characteristic, including the step of varying a characteristic of a harvesting arrangement arranged to harvest the energy, the characteristic of the harvesting arrangement being varied in response to the varying energy characteristic of the vibrational energy source for a non-instantaneous time period, the method including the further step of determining changes in the varying energy characteristic over the non-instantaneous time period and adaptively controlling the variation of the characteristic of the harvesting arrangement in response to the determined changes based on an adaptive learning algorithm.

2. A method in accordance with claim 1, including the further steps of monitoring the varying energy characteristic over the non-instantaneous time period to obtain a variation parameter, and controlling the varying of the characteristic of the harvesting arrangement, utilising the variation parameter.

3. A method in accordance with claim 2, wherein a transducer is utilised to convert the vibrational energy into electrical energy, and wherein the variation parameter is current or voltage.

4. A method in accordance with claim 1, wherein the step of adaptively controlling includes a step of predicting changes in the varying energy characteristic and controlling the variation of the characteristic of the harvesting arrangement in response to the predicted changes.

5. A method in accordance with claim 1, wherein the harvesting arrangement includes an electrical harvesting circuit and the characteristic of the harvesting arrangement is impedance of the harvesting circuit.

6. An apparatus for harvesting energy from a vibrational energy source having a varying energy characteristic, the apparatus including a harvesting arrangement arranged to harvest the energy, the harvesting arrangement having a characteristic which is arranged to be varied in response to the varying energy characteristic of the vibrational energy source for a non-instantaneous time period, the apparatus further including a controller which is arranged to determine changes in the varying energy characteristic over the non-instantaneous time period and adaptively control the variation of the characteristic of the harvesting arrangement in response to the determined changes based on an adaptive learning algorithm.

7. An apparatus in accordance with claim 6, further including a controller arranged to control the harvesting arrangement to vary the characteristic of the harvesting arrangement.

8. An apparatus in accordance with claim 7, further including a monitor for monitoring a magnitude of vibration of the vibrational energy source over the non-instantaneous time period to derive a variation parameter, the variation parameter being employed by the controller to control the varying characteristic of the harvesting arrangement.

9. An apparatus in accordance with claim 6, wherein an electrical transducer is utilised to convert the vibrational energy to electrical energy, and wherein the variation parameter is current or voltage from the transducer.

10. An apparatus in accordance with claim 6, wherein the controller is arranged to predict changes in the varying energy characteristic and control the variation of the characteristic of the harvesting arrangement in response to the predicted changes.

11. An apparatus in accordance with claim 6, wherein the harvesting arrangement includes an electrical harvesting circuit and the characteristic of the harvesting arrangement is impedance of the harvesting circuit.

12. An apparatus for controlling a harvesting arrangement for harvesting energy from a vibrational energy source, the apparatus including:
a monitor arranged to monitor a varying energy characteristic of the vibrational energy source; and
a controller arranged to vary a characteristic of the harvesting arrangement in response to the varying energy characteristic of the vibrational energy source for a non-instantaneous time period, wherein the controller is arranged to determine changes in the varying energy characteristic over the non-instantaneous time period and adaptively control the variation of the characteristic of the harvesting arrangement in response to the determined changes utilizing an adaptive learning algorithm.

13. An apparatus in accordance with claim 12, wherein the controller is arranged to predict changes in the variable energy characteristic and control the variation of the characteristic of the harvesting arrangement in response to the predicted changes.

* * * * *